3,178,465
LINEAR POLYACETYLENIC ISOCYANATO COMPOUNDS
Francis Huba, Fairport Harbor, John H. Wotiz, Mentor, and Frank B. Slezak, Painesville, Ohio, assignors to Diamond Alkali Company, Cleveland, Ohio, a corporation of Delaware
No Drawing. Filed Sept. 7, 1960, Ser. No. 54,338
4 Claims. (Cl. 260—453)

This invention relates to novel isocyanato linear polyacetylenic compounds, N,N'-bis-ureido (or urylene) derivatives thereof, and their preparation and use.

Broadly, this invention relates to isocyanato-terminated linear polyacetylenic compounds and N,N'-bis-ureido (or urylene) derivatives thereof, which compounds have the structure:

(I)
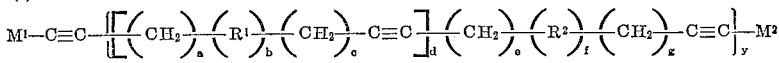

wherein $M^1$ and $M^2$ are the same or different and are selected from the group consisting of chloroalkyl-, bromoalkyl-, isocyanate-substituted alkyl radicals, notably isocyanato-terminated alkyl radicals, and

(wherein R is alkyl) and hydrogen, with the proviso that at least one of $M^1$ and $M^2$ must be an -alkylene-NCO group; $a$ is a number from 0 to 20, inclusive; $b$ is a number from 0 to 2, inclusive; $c$ is a number from 0 to 20, inclusive; $d$ is a number from 0 to 20, inclusive; $e$ is a number from 0 to 20, inclusive; $f$ is a number from 0 to 2, inclusive; $g$ is a number from 0 to 20, inclusive; $y$ is a number from 1 to 100; $R^1$ and $R^2$ are the same or different radicals selected from the group consisting of alkylene radicals, e.g., radicals having the structure —$C_mH_{2m}$— (and corresponding branched chain radicals), wherein $m$ is a number from 1 to 50; arylene radicals, e.g.,

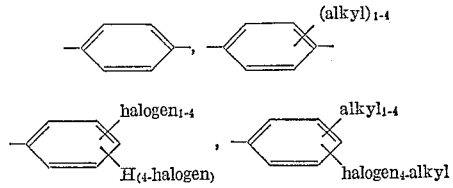

as well as corresponding ortho and meta radicals; oxygen; sulfur;

mercury; boron; boron-containing radicals such as

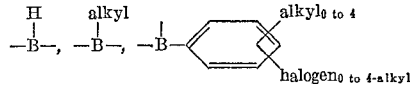

heterocyclic radicals such as

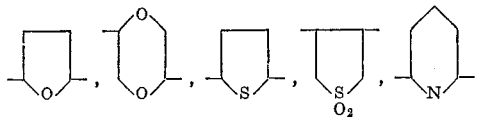

aryl-substituted alkylene radicals, e.g.,

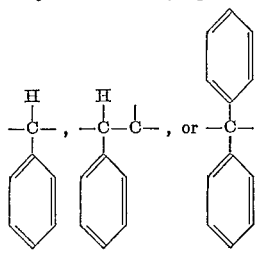

substituted alkylene radicals, e.g.,

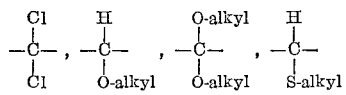

tin; silicon;

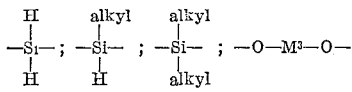

(wherein $M^3$ is selected from the group consisting of calcium, barium, zinc, tin, lead,

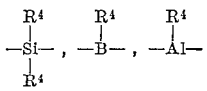

$R^4$ being selected from the group consisting of hydrogen, lower alkyl, i.e., up to about 10 carbon atoms, or aryl radicals, e.g., phenyl or naphthyl).

More particularly, novel compounds of this invention have the following structure:

(II)
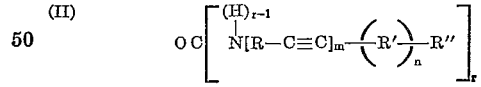

wherein R and R' are the same or different alkylene radicals; R" can be hydrogen when $n=0$, chlorine or bromine or —NCO when $n=1$; $m$ is 1 to 20, inclusive; $n$ is 0 or 1; and $r$ is 1 or 2.

The terms "alkyl" and "alkylene," i.e., mono and divalent radicals, respectively, as used in the specification and claims, unless otherwise defined, are intended to refer to various monovalent straight chain, e.g., $CH_3(CH_2)_{a'}$ groups, as well as branched chain derivatives thereof wherein $a'$ is a number from 0 to 15; and to corresponding straight and branched chain divalent groups, e.g., —CH₂)ᵦ'— wherein $b'$ is a number from 1 to 50. The term "lower" used with either "alkyl" or "alkylene" is intended to refer to radicals containing up to 10 carbon atoms.

Specific examples of "alkyl" and "alkylene radicals" are those containing 2 to 5 carbon atoms, e.g.;

| Alkylene Radicals | Alkyl Radicals |
|---|---|
| —CH₂—CH₂— | CH₃—CH₂— |
| —CH₂—CH₂—CH₂— | CH₃—CH₂—CH₂— |
| —CH₂—CH₂—CH₂—CH₂— | CH₃ CH—CH₂—<br>　　｜<br>　　CH₃ |
| —CH₂—CH₂—CH₂—CH₂—CH₂— | |
| —CH₂—CH₂—CH—CH₂—<br>　　　　｜<br>　　　　CH₃ | CH₃—CH₂—CH₂—CH₂— |
| | CH₃—CH₂—CH₂—CH₂—CH₂— |
| —CH₂—CH—CH₂—<br>　　｜<br>　　CH₃ | CH₃—CH—CH₂—CH₂—<br>　　｜<br>　　CH₃ |
| —CH₂—CH—CH—<br>　　｜　　｜<br>　　CH₃ CH₃ | CH₃—CH—CH—<br>　　｜　　｜<br>　　CH₃ CH₃ |
| —CH—CH—<br>　｜　　｜<br>　CH₃ CH₂—CH₃ | |
| —CH₂—CH—CH₂<br>　　｜<br>　　CH₂—CH₃ | |

Compounds of this invention are useful in various applications, including pesticidal uses. As used in the specification and claims, the terms "pesticide," "pests," and "pesticidal" are intended to refer to the killing and/or controlling of the growth of plants, bacteria, microorganisms, fungi, or the like. Thus, it will be appreciated that applications commonly termed bactericidal, herbicidal, fungicidal, or the like, are contemplated. Other uses of compounds of this invention include applications as polymers, polymer precursors (monomers), solid rocket fuel componets, e.g., binders, as coatings, corrosion inhibitors, lubrication oil additives, films, fibers, intermediates, high energy fuels, or fuel components, rocket fuel starters, plasticizers, stabilizers, and the like.

Specific illustrative compounds of this invention are the following:

1,16-diisocyanato-5,11-hexadecadiyne

1-isocyanato-5,11-dodecadiyne

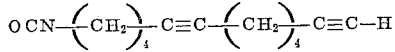

N,N′-bis (5,11-dodecadiynyl) urea

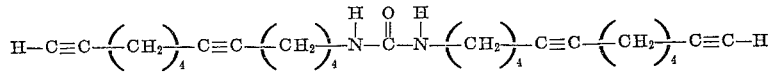

Compounds of this invention can be prepared by reacting with phosgene a linear, non-conjugated polyacetylenic primary mono- or di-amine either as such or as prepared in situ when an alkylene dihalide in molar excess is reacted with a dimetal acetylide or polyacetylide and/or mixtures thereof with corresponding monometal acetylides and polyacetylides as described and claimed in Ser. No. 831,930, filed August 6, 1959, and Ser. No. 769,583, filed October 27, 1958, now Patent No. 3,052,-734, and the resulting halogen-terminated reaction product is in turn reacted with ammonia and the excess ammonia removed. Alternatively, such compounds also can be prepared by reacting phosgene with polyacetylenic primary amine salts such as hydrochlorides or carbamates.

Illustrative of the foregoing type of polyacetylenic compounds useful as starting materials for the production of compounds of this invention, either as such, or during their preparation, are the following:

1-amino-5,11-dodecadiyne

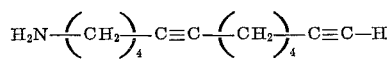

1,16-diamino-5,11-hexadecadiyne

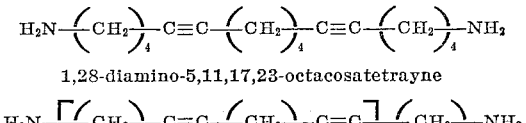

1,28-diamino-5,11,17,23-octacosatetrayne $$H_2N-\left[\left(CH_2\right)_4-C\equiv C-\left(CH_2\right)_4-C\equiv C\right]_2-\left(CH_2\right)_4-NH_2$$

More specifically, compounds of this invention can be prepared by phosgenating a linear, polyacetylenic α,ω-diamine, or terminal mono amine, preferably in the form of an amine hydrochloride salt or carbamate derivative of the mono or diamine. Contrary to what might be expected, the reaction does not involve the acetylenic bonds. The reaction advantageously is carried out at atmospheric pressure in the presence of a liquid diluent or solvent, e.g., p-xylene, o-xylene, m-xylene or, if desired, mixtures thereof as comprise commercial-grade xylenes, toluene, benzene, or the like.

In general, it is desirable to employ a reaction temperature within the range from about 100° to 200° C., preferably about 100° to 150° C. Thus, the solvent generally can be any neutral hydrocarbon boiling at a temperature from about 100° to 200° C. In practice, phosgene can be introduced into a refluxing mixture of solvent or diluent and the polyacetylenic compound. Reaction temperature, thus, are dictated in part by the boiling point of the liquid diluent or solvent employed, e.g., using p-xylene, the reaction temperature can be within the range from about 115° to 135° C., preferably about 120° to 132° C.

While compounds of this invention may be employed in a variety of applications, biologically active or otherwise, when employed as biologically-active materials it will be understood, of course, that such compounds may be utilized in diverse formulations, both liquid and solid, including finely-divided powders and granular materials as well as liquids such as solutions, concentrates, dispersions, emulsifiable concentrates, emulsions, slurries and the like, depending upon the application intended and the formulation medium desired.

These compounds may be used alone or in combination with other known biologically-active materials such as other acetylenically-unsaturated compounds, organic phosphate pesticides, fertilizers, chlorinated hydrocarbon insecticides, foliage and soil fungicides and the like.

Thus, it will be appreciated that compounds of this invention may be employed to form biologically-active substances containing such compounds as essential active ingredients, which compositions may also include finely-divided dry or liquid carriers, extenders, fillers, conditioners, including various clays, such as talc, spent catalyst, alumina silica materials, liquids, solvents, diluents, or the like, including water and various organic liquids such as benzene, toluene, chlorinated benzene, acetone, cyclohexanone, chlorinated xylene, carbon tetrachloride, ethylene dichloride, tetrachloroethylene and carbon disulfide.

When liquid formulations are employed or dry materials prepared which are to be used in liquid form, it is desirable in certain instances additionally to employ a wetting, emulsifying or dispersing agent to facilitate use of the formulation, e.g., Triton X–155 (alkyl aryl polyether alcohol, U.S. Patent 2,504,064). Other suitable surface active agents may be found in an article by John W. McCutcheon in Soap and Chemical Specialties, vol. 4, Nos. 7–10 (1955).

The term "carrier" as employed in the specification and claims is intended to refer broadly to materials constituting a major proportion of a biologically-active or other formulation and hence includes finely-divided materials, both liquids and solids, as aforementioned, conveniently used in such applications.

In order that those skilled in the art may more completely understand the present invention and the preferred methods by which the same may be carried into effect, the following specific examples are offered:

EXAMPLE 1

Part A

PREPARATION OF 1,16-DIAMINO-5,11-HEXADECADIYNE

A five-gallon autoclave, equipped with an agitator and temperature control means, is charged with 2.5 gallons of liquid ammonia. 4 moles of

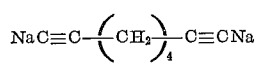

are prepared using 4 moles of

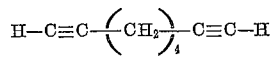

and 8 moles of sodium amide. The temperature is maintained at −33° C. After one hour of additional stirring, 8 moles of $Br(CH_2)_4Br$ are added rapidly at −50° to −55° C. (via external cooling). The temperature is then raised to and maintained at −40° to −33° C. for two hours. The autoclave is then sealed and the temperature is kept near 50° C., which raises the autogenous ammonia pressure to about 400 p.s.i.g. The temperature is maintained at 50° C. for two hours. The contents of the autoclave are then allowed to cool overnight, the ammonia is vented and the residue treated with water and the resulting two layers separated. 93% of the initial bromine content is found in the water layer as bromide ions. The organic portion of the mixture (about 1 kg.) is diluted with 2 liters of ethyl ether and washed with three 1-liter portions of a 10% aqueous NaOH solution. The ether solution is dried with anhydrous $Na_2SO_4$, filtered and diluted with 5 liters of ethyl ether. The solution is stirred in a 10-liter flask equipped with condenser, and dry $CO_2$ is passed into the solution to saturate it. A solid is immediately formed. After one-half hour of $CO_2$ introduction, the solid is removed by filtration. The solid [1] comprises the $CO_2$ derivatives (carbamates) of α,ω-polyacetylenic diamines and all other products are in the filtrate.

The solid $CO_2$ derivative is treated with a tenfold volume of 10% aqueous NaOH solution at 70° C. and the formed oily amine layer is separated and purified by distillation. This compound boils at 152° C. at 0.05 mm. Hg pressure. Melting point 3° C., $n_D^{22}$=1.4980. The results of the chemical analysis indicate preparation of the desired 1,16-diamino-5,11-hexadecadiyne ($C_{16}H_{28}N_2$) and are as follows:

| Element | Actual (percent by weight) | Calculated (percent by weight) |
|---|---|---|
| C | 78.1 | 77.4 |
| H | 10.9 | 11.3 |
| N | 10.7 | 11.3 |

The experimentally-determined molecular weight is 239 while the calculated is 248. Infrared spectra confirm the assigned structure.

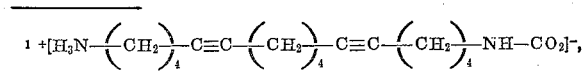

[1] 16-amino-5,11-hexadecadiynylcarbamic acid (zwitter-ion), m.p. 121°–123° C.

Part B

PREPARATION OF 16-AMINO-5,11-HEXADECADIYNYLCARBAMIC ACID (ZWITTER-ION)

248 g. of 1,16-diamino-5,11-hexadiyne are dissolved in dry ethyl ether and the solution is saturated with dry $CO_2$ which causes an immediate precipitation of a white solid. When $CO_2$ is no longer absorbed, the white solid is separated by filtration and crystallized from an ethanol-ethyl ether mixture. The material melts at 121°–123° C. and weighs 276 g. which corresponds to a 95% yield of the desired.

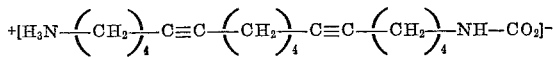

The results of chemical analysis confirm the preparation of the desired $C_{17}H_{28}N_2O_2$ and are as follows:

| Element | Actual (percent by weight) | Calculated (percent by weight) |
|---|---|---|
| C | 69.8 | 69.8 |
| H | 9.5 | 9.6 |
| N | 9.8 | 9.2 |

The experimentally-determined molecular weight is 275, while the calculated molecular weight is 292. The infrared spectrum confirms the structure. The compound is very soluble in water, alcohol and acetone.

Part C

PREPARATION OF 1,16-DIISOCYANATO-5,11-HEXADECADIYNE 30 g. of 16-amino-5,11-hexadecadiynylcarbamic acid is suspended in 300 ml. of redistilled xylene in a flask provided with an agitator and temperature control means. The apparatus is swept previously with dry nitrogen gas. Phosgene is introduced (100 ml./min.) into this suspension for one-half hour at 5° C., then at reflux temperature (at 120°–132° C.) for about 2 hours until the suspension changes to a reddish-colored solution. Heating is stopped and phosgene introduction is continued while the reaction mixture is allowed to cool to room temperature.

The excess absorbed phosgene and the formed HCl are driven out by passing dry $N_2$ gas through the solution. The desired compound is separated by distillation. It boils at 181°–182° C. at 0.1 mm. Hg, $n_D^{25}$=1.4897. The compound is identified as 1,16-diisocyanato-5,11-hexadecadiyne. The results of the chemical analysis indicate formation of the desired $C_{16}H_{24}N_2O_2$ and are as follows:

| Element | Actual (percent by weight) | Calculated (percent by weight) |
|---|---|---|
| C | 71.8 | 72.0 |
| H | 8.0 | 8.0 |
| N | 8.9 | 9.3 |

The determined molecular weight is 253 and the calculated is 300. The infrared spectrum is consistent with the assigned structure.

Part D

BACTERICIDAL ACTIVITY 1,16-diisocyanato-5,11-hexadecadiyne is examined for ability to inhibit the growth of three bacterial species (*Erwinia amylovora*, *Xanthomonas phaseoli* and *Micrococcus pyogenes* var. *aureus*) at a concentration of 250 p.p.m. The formulation (0.1 g. test compound combined with 4 ml. of acetone and 2 ml. of solution of 0.5% by volume of Triton X–155 in water) is diluted without maintaining the concentration of the emulsifier or solvent. The first two above-named test species are Gram negative rods and the third species is Gram positive. They are all cultured on nutrient agar slants except *X. phaseoli* which is grown on potato dextrose agar. The cultures used for tests are sub-cultured for two sequential 24-hour periods to insure uniform test populations. Bacterial suspensions are made from the second sub-culture in the culture tube by addition of distilled water and gentle agitation after which they are filtered through double layers of cheesecloth and adjusted to standard concentrations by turbimetric measurement. Each of three test tubes arranged in a rack receive one ml. of the 1250 p.p.m. test formulation. After the test formulations have been measured into a test tube 3½ ml. of distilled water and ½ ml. of bacterial suspension for each respective test organism is added to each test tube. The medication tubes are then set aside at room temperature for four hours. After this exposure period transfers are made by means of a standard four mm. platinum loop to 7 ml. of sterile broth into test tubes arranged in racks similar to those for the medication tubes. The broth tubes are then incubated for 48 hours at 29° C. at which time growth is measured by use of a Bausch & Lomb spectronic "20" direct reading colorimeter. A reading is recorded for each test tube after shaking. Three replicates of each organism serve as controls. Calculations are made on percent of the mean check readings. This figure subtracted from 100 gives percent control as compared to checks. The compound tested gives a 100% control as compared to a check.

*Part E*

HERBICIDAL ACTIVITY

Bean plants, variety Tendergreen, just as the trifoliate leaves are beginning to unfold, are sprayed with test formulation at a concentration of 4800 p.p.m. (0.48%) or about four pounds active chemical per 100 gallons of water. Four test plants are all sprayed simultaneously with 80 ml. of the standard cyclohexanone formulation (384 mg. test chemical combined with 10 ml. cyclohexanone, 8 ml. of Triton X–155 solution of Part B and 62 ml. distilled water) at 40 p.s.i.g. while being rotated on a turntable in a spray hood. The concentrations of the solvent, cyclohexanone and emulsifier Triton X–155 are always maintained at 12.5% and 0.05% by volume, respectively.

After the plants are dry, they are removed to the greenhouse. Records are taken 14 days after treatment. Phytotoxicity is rated on a scale from 0 to 11 based on the Weber-Fechner law which states that visual acuity depends on the logarithm of the intensity of the stimulus. In grading phytotoxicity the stimulus changes at the 50% level. The grades are as follows based on percent of leaf area destroyed: 0=no injury; 1=0 to 3; 2=3 to 6; 3=6 to 12; 4=12 to 25; 5=25 to 50; 6=50 to 75; 7=85 to 87; 8=87 to 94; 9=94 to 97; 10=97 to 100, and at 11 the plant is dead. 1,16-diisocyanato-5,11-hexadecadiyne exhibits a rating of 9.

*Part F*

*Panagrellus redivivus* nematodes are exposed to 1,16-diisocyanato-5,11-hexadecadiyne in watch glasses (27 mm. diameter x 8 mm. deep) placed within a 9 cm. Petri dish. The glasses each receive 0.4 ml. of a test formulation (0.1 g. test compound, 4 ml. acetone, 2 ml. stock emulsifier solution—0.5% Triton X–155 by volume—with sufficient distilled water added to obtain a total volume of 80 ml.) at 1250 p.p.m. 0.1 ml. of Panagrellus suspension is added to each glass, thus bringing the concentration down to 1000 p.p.m. Each watch glass contains 30 to 40 nematodes. At the end of 48 hours mortality counts are made. 1,16-diisocyanato-5,11-hexadecadiyne causes a 100% nematode kill at 100 p.p.m.

EXAMPLE 2

*Part A*

PREPARATION OF 1-AMINO-5,11-DODECADIYNE

The ether-product filtrate, after removal of $CO_2$ solid derivative of α,ω-polyacetylenic diamines (as in Example 1, Part A) is distilled. The main product boils at 82°–85° C. at 0.05 mm. Hg, $n_D^{25}=1.4836$, and is identified as 1-amino-5,11-dodecadiyne. The results of the chemical analysis indicate the formation of the desired $C_{12}H_{19}N$ and are as follows:

| Element | Actual (percent by weight) | Calculated (percent by weight) |
|---|---|---|
| C | 80.4 | 81.32 |
| H | 10.3 | 10.75 |
| N | 7.7 | 7.93 |

The actual molecular weight found is 166, 170 while the calculated is 177. The infrared spectrum is consistent with the assigned structure.

*Part B*

PREPARATION OF 1-AMINO-5,11-DODECADIYNE HYDROCHLORIDE 0.1 mol of 1-amino-5,11-dodecadiyne is dissolved in two liters of anhydrous ethyl ether and anhydrous HCl gas is introduced while the mixture is stirred and cooled. The obtained solid is filtered, washed with ether on the filter, dried and crystallized from acetone. The product melts at 123°–125° C. and is identified as 1-amino-5,11-dodecadiyne hydrochloride. The results of the analysis indicate the preparation of the desired compound $C_{12}H_{20}ClN$ and are as follows:

| Element | Actual (percent by weight) | Calculated (percent by weight) |
|---|---|---|
| C | 67.3 | 67.4 |
| H | 9.5 | 9.45 |
| Cl | 17.1 | 16.60 |
| N | 7.7 | 6.55 |

The infrared spectrum is consistent with the indicated structure.

*Part C*

PREPARATION OF 1-ISOCYANATO-5,11-DODECADIYNE 55 g. (0.257 mol) of 1-amino-5,11-dodecadiyne hydrochloride is suspended in 400 ml. redistilled xylene in a flask equipped with an agitator and temperature control means. The apparatus is flushed previously with dry $N_2$ gas. Phosgene is introduced into this suspension for one-half hour at 5° C., then at reflux temperature (120°–132° C.) for about two hours until the suspension changes to a solution. Heating is stopped and phosgene introduction is continued while the reaction mixture is allowed to cool to room temperature. The excess phosgene and the formed HCl are driven out by passing dry $N_2$ gas through the solution.

The desired compound is separated by distillation. It boils at 96° C. at 0.06 mm. Hg, $n_D^{25}=1.4777$. The compound is identified as 1-isocyanato-5,11-dodecadiyne. The results of the chemical analysis indicate preparation of the desired $C_{13}H_{17}NO$ and are as follows:

| Element | Actual (percent by weight) | Calculated (percent by weight) |
|---|---|---|
| C | 76.3 | 76.8 |
| H | 8.3 | 8.3 |
| N | 7.0 | 6.90 |

The experimentally-found molecular weight is 179; the calculated is 203. The infrared spectrum confirms the structure.

*Part D*

Using the procedure of Example 1, Part D, but substituting *Escherichia coli* for *Micrococcus pyogenes* var. *aureus*, 1-isocyanato-5,11-dodecadiyne causes a 100% kill of each species.

*Part E*

Using the procedure of Example 1, Part E, 1-isocyanato-5,11-dodecadiyne kills both tomato and bean plants.

*Part F*

1-isocyanato-5,11-dodecadiyne at 1250 p.p.m.[2] is tested for its ability to inhibit germination of spores of *Monilinia fructicola*. Germination records are taken after 22 hours of incubation at 22° C. It is observed that the test compound has an ED-50 value (corresponding to the concentration that inhibits germination of half the spores in the test drops) of equal to or better than 0.1 p.p.m.

*Part G*

To indicate the ability of 1-isocyanato-5,11-dodecadiyne to inhibit germination of sclerotia of *Sclerotium rolfsii*, black blotting paper pads (2" x 2") are placed in a 200 ml. formulation.[3] Each pad retains approximately 400 mg. of test chemical. Twenty sclerotia are placed on each pad which is then placed in a bottle and capped. After 48 hours at room temperature it is observed that complete inhibition of sclerotial germination is achieved.

EXAMPLE 3

PREPARATION OF N,N'-BIS(5,11-DODECADIYNYL)UREA

A flask is charged with 26 g. (0.13 mol) of 1-isocyanato-5,11-dodecadiyne and stirred while the flask is open to the atmosphere (moist air). The liquid gradually turns cloudy and pasty. After two days the pasty product is treated with 200 ml. of hot water. The formed white solid is separated by filtration, purified by recrystallization from ethanol and it melts at 97°–98° C. The result of

---

[2] 0.1 g. test compound+4 ml. acetone+2 ml. (0.5% by volume of Triton X–155 in water) diluted to 80 ml. with distilled water.
[3] 0.1 g. test compound+4 ml. acetone+2 ml. (0.5% by volume Triton X–155 in water) diluted to 200 ml. with distilled water.

chemical analysis shows the formation of the desired ($C_{25}H_{36}N_2O$),

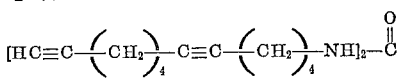

| Element | Actual (percent by weight) | Calculated (percent by weight) |
|---|---|---|
| C | 78.8 | 79.0 |
| H | 9.3 | 9.5 |
| N | 7.9 | 7.3 |

The infrared spectrum supports the indicated structure.

It is to be understood that although the invention has been described with specific reference to particular embodiments thereof, it is not to be so limited, since changes and alterations therein may be made which are within the full intended scope of this invention as defined by the appended claims.

What is claimed is:
1. A compound of the structure

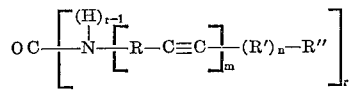

wherein R and R' are alkylene radicals having from 2 to 10 carbon atoms; R" is selected from the group consisting of hydrogen, chlorine, bromine and —NCO; $m$ is a number from 2 to 20, inclusive; $r$ is a number from 1 to 2, inclusive; and $n$ is a number from 0 to 1, inclusive, with $n$ being 0 when R" is hydrogen and $n$ being 1 when R" is of chlorine, bromine and —NCO.

2. The compound 1,16 - diisocyanato - 5,11 - hexadecadiyne.

3. The compound 1-isocyanato-5,11-dodecadiyne.

4. The compound N,N'-bis(5,11-dodecadiynyl)urea.

References Cited in the file of this patent
UNITED STATES PATENTS

| | | |
|---|---|---|
| 2,733,254 | Allen et al. | Jan. 31, 1956 |
| 2,908,704 | Skiles | Oct. 13, 1959 |
| 3,016,327 | Schmitz et al. | Jan. 9, 1962 |

OTHER REFERENCES

Sato et al.: Chem. Abstracts, vol. 53 (1959), pp. 5112e.
Lucas: "Organic Chemistry," 2nd ed., pages 110, 111 (1953), publ. American Book Co., New York, New York.